United States Patent
Park et al.

(10) Patent No.: US 7,657,713 B2
(45) Date of Patent: Feb. 2, 2010

(54) MEMORY USING PACKET CONTROLLER AND MEMORY

(75) Inventors: Bok-Gue Park, Suwon-si (KR); Dong-Il Seo, Yongin-si (KR); Hyun-Soon Jang, Seoul (KR); Woo-Seop Jeong, Yongin-si (KR)

(73) Assignee: Samsung Electronics Co., Ltd., Suwon-Si- Gyenoggi-do (KR)

( * ) Notice: Subject to any disclaimer, the term of this patent is extended or adjusted under 35 U.S.C. 154(b) by 281 days.

(21) Appl. No.: 10/948,674

(22) Filed: Sep. 24, 2004

(65) Prior Publication Data

US 2005/0094631 A1 May 5, 2005

(30) Foreign Application Priority Data

Oct. 31, 2003 (KR) .................... 10-2003-0076957

(51) Int. Cl.
*G06F 13/14* (2006.01)
(52) U.S. Cl. .................. 711/154; 711/156; 370/378; 370/389; 365/189.07; 365/222; 324/765; 257/787
(58) Field of Classification Search .......... 711/154, 711/156; 370/378, 389; 365/189.07, 222; 324/765; 257/787
See application file for complete search history.

(56) References Cited

U.S. PATENT DOCUMENTS

| 5,276,642 A | * | 1/1994 | Lee | 365/189.04 |
|---|---|---|---|---|
| 6,759,753 B2 | * | 7/2004 | Chao | 257/787 |
| 6,812,726 B1 | * | 11/2004 | Ong | 324/765 |
| 2002/0087790 A1 | * | 7/2002 | Barth et al. | 711/114 |
| 2002/0172085 A1 | * | 11/2002 | Feurle | 365/200 |
| 2003/0193424 A1 | | 10/2003 | Chiang | |
| 2003/0198115 A1 | * | 10/2003 | Schaefer et al. | 365/222 |
| 2004/0022088 A1 | * | 2/2004 | Schaefer | 365/189.07 |
| 2004/0252689 A1 | | 12/2004 | Park et al. | |

FOREIGN PATENT DOCUMENTS

KR 2004-0106198 12/2004

OTHER PUBLICATIONS

Schilling, Donald L. & Belove, Charles; Registers, Counters, and Arithmetic Circuits; Electronic Circuits: Discrete and Integrated, Second Edition, Copyright 1979; pp. v-vi and 648-650; McGraw-Hill Book Company; United States of America.
Taub, Herbert & Schilling, Donald; Registers and Counters; Digital Integrated Electronics; Copyright 1977; pp. v-vi and 325-326; McGraw-Hill Book Company; United States of America.

* cited by examiner

*Primary Examiner*—Tuan V Thai
*Assistant Examiner*—Yong Choe
(74) *Attorney, Agent, or Firm*—Volentine & Whitt, P.L.L.C.

(57) ABSTRACT

A memory that includes a plurality of packet pins, a synchronous memory, and a packet controller. The synchronous memory receives address and control signals in synchronization with a clock signal. The packet controller sequentially receives packet data bits through the packet pins in synchronization with the clock signal when a packet enable signal is activated, and converts the inputted packet data into the address and control signals. Specifically, packet data bits that are first inputted through the packet pins represent an operation mode.

30 Claims, 6 Drawing Sheets

MEMORY USING PACKET CONTROLLER AND MEMORY

BACKGROUND OF THE INVENTION

1. Field of the Invention

Embodiments of the present invention relate to a memory system using a packet manager.

2. Description of the Related Art

Mobile applications (e.g. personal digital assistants (PDA), third-generation (3G) mobile phones, and digital still cameras) may require miniaturization and flexibility. Such miniaturization and flexibility may be accomplished through semiconductor fabrication. However, miniaturization through semiconductor fabrication may be limited due to development lag and the cost of enhanced fabrication. Multi-chip package (MCP) technology has been developed for mobile applications in order to obtain miniaturization. MCP includes multi-chip products in which various memory chips (e.g. NOR flash memory, NAND flash memory, SRAM, and UtRAM) are mounted on one package and are fabricated at a level almost equal to general memory, using cutting-edge package technology. Compared to using separate components in mobile equipment, the MCP technology can reduce inner package area by more than 50% and may simplify interconnections, thereby reducing manufacturing costs and enhancing productivity. System in package (SIP) technology has been adopted in mobile applications. SIP includes products in which non-memory components and memory components are mounted on one package. In SIP, chips are stacked three-dimensionally and internally connected with each other. This stacked structure can reduce package area and obtain various effects (e.g. reduction in development lag, reduction of cost, high speed operation).

However, MCP components and SIP components may include a large number of chips and thus a large number of pins are present. This is an obstacle in the configuration of a system. Further, a memory may also include a large number of pins (e.g. address pins, data pins, and control pins), which is an obstacle in the configuration of a memory system adopted in mobile applications.

SUMMARY OF THE INVENTION

Embodiments of the present invention is directed to a memory and a memory system that substantially obviate complications stemming from a large number of pins. Accordingly, it is an object of embodiments of the present invention to provide a memory and a memory system, which are capable of reducing the number of external pins. It is an object of embodiments of the present invention to provide a memory and a memory system, in which the operating period of time is varied depending on the operating mode.

According to aspects of embodiments of the present invention, a memory comprises: a plurality of packet pins; a synchronous memory which receives address and control signals in synchronization with a clock signal; and a packet controller which sequentially receives packet data bits through the packet pins in synchronization with the clock signal when a packet enable signal is activated and converts the input packet data into the address and control signals. Packet data bits that are first input through the packet pins represent an operation mode.

The packet controller detects whether or not the first packet data bits represent an operation that requires address information. For example, if the first packet data bits represent an operation that does not require the address information, the packet controller generates the control signals after the input of the first packet data bits, without regard to input of the remaining packet data bits. Likewise, if the first packet data bits represent an operation that requires address information, the packet controller generates the address and control signals in synchronization with the clock signal after input of the remaining packet data bits.

In embodiments, the first packet data bits are a combination of data bits that represent a command. Also, the first packet data bits may be a combination of the control signals. In embodiments, the packet enable signal is a chip select signal. In embodiments, the synchronous memory performs a burst operation in synchronization with the clock signal. In embodiments, the synchronous memory and the packet controller are mounted on one package. The package may be either a multi-chip package (MCP) or a system in package (SIP).

According to aspects of embodiments of the present invention, a memory comprises: A plurality of packet pins. A synchronous memory which receives address and control signals in synchronization with a clock signal. A decoding circuit which receives packet data bits through the packet pins at a first edge of the clock signal when a packet enable signal is activated and outputs decoding signals. A delay circuit which delays the decoding signals. A detecting circuit which detects whether the packet data bits input at the first edge of the clock signal represent an operation that requires address information and generates a latch enable signal. A selector circuit which selects output signals of the delay circuit or output signals of the decoding circuit in response to the latch enable signal and outputs the selected signals as the control signals. An address latch circuit which receives packet data bits at the remaining edges of the clock signal in response to the latch enable signal and outputs the input packet data bits as the address signals.

In embodiments, if the packet data bits input at the first edge of the clock signal represent an operation that does not require address information, the selector circuit selects the output signals of the decoding circuit as the control signals and the synchronous memory operates in response to the control signals output from the selector circuit without input of the address signals. In embodiments, if the packet data bits input at the first edge of the clock signal represent an operation that requires address information, the selector circuit selects the output signals of the delay circuit as the control signals and the synchronous memory operates in response to the control signals and the address signals.

According to aspects of the present invention, a memory system comprises: A synchronous memory which receives address and control signals in synchronization with a clock signal. A memory controller which generates the clock signal and a packet enable signal and outputs packet data, wherein the packet data including address and command information. A packet controller which converts the packet data into the address and control signals when the packet enable signal is activated, wherein packet data input at a first edge of the clock signal in the activation of the packet enable signal includes the command information, and wherein the synchronous memory and the packet controller are mounted on one package.

In embodiments, the synchronous memory performs a burst operation in synchronization with the clock signal. The package may be either a multi-chip package (MCP) or a system in package (SIP). The operation of converting the packet data and a burst operation of the synchronous memory may be performed at the same operating frequency as the clock signal.

In embodiments, the packet controller includes: A decoding circuit which receives the packet data bits through the packet pins at a first edge of the clock signal when the packet enable signal is activated and outputs decoding signals. A delay circuit which delays the decoding signals. A detecting circuit which detects whether the packet data bits input at the first edge of the clock signal represent an operation that requires address information and generates a latch enable signal. A selector circuit which selects output signals of the delay circuit or output signals of the decoding circuit in response to the latch enable signal and outputs the selected signals as the control signals. An address latch circuit which receives packet data bits at the remaining edges of the clock signal in response to the latch enable signal and outputs the input packet data bits as the address signals.

In embodiments, if the packet data bits input at the first edge of the clock signal represent an operation that does not require the address information, the selector circuit selects the output signals of the decoding circuit as the control signals and the synchronous memory operates in response to the control signals output from the selector circuit without input of the address signals. In embodiments, if the packet data bits input at the first edge of the clock signal represent the operation that requires address information, the selector circuit selects output signals of the delay circuit as the control signals and the synchronous memory operates in response to the control signals and the address signals.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. It is to be understood that both the foregoing general description and the following detailed description of the present invention are examples and explanatory and are intended to provide further example explanations of the invention as claimed.

BRIEF DESCRIPTION OF THE DRAWINGS

Example

Example

Example

Example

Example

DETAILED DESCRIPTION OF THE INVENTION

Figure 1:
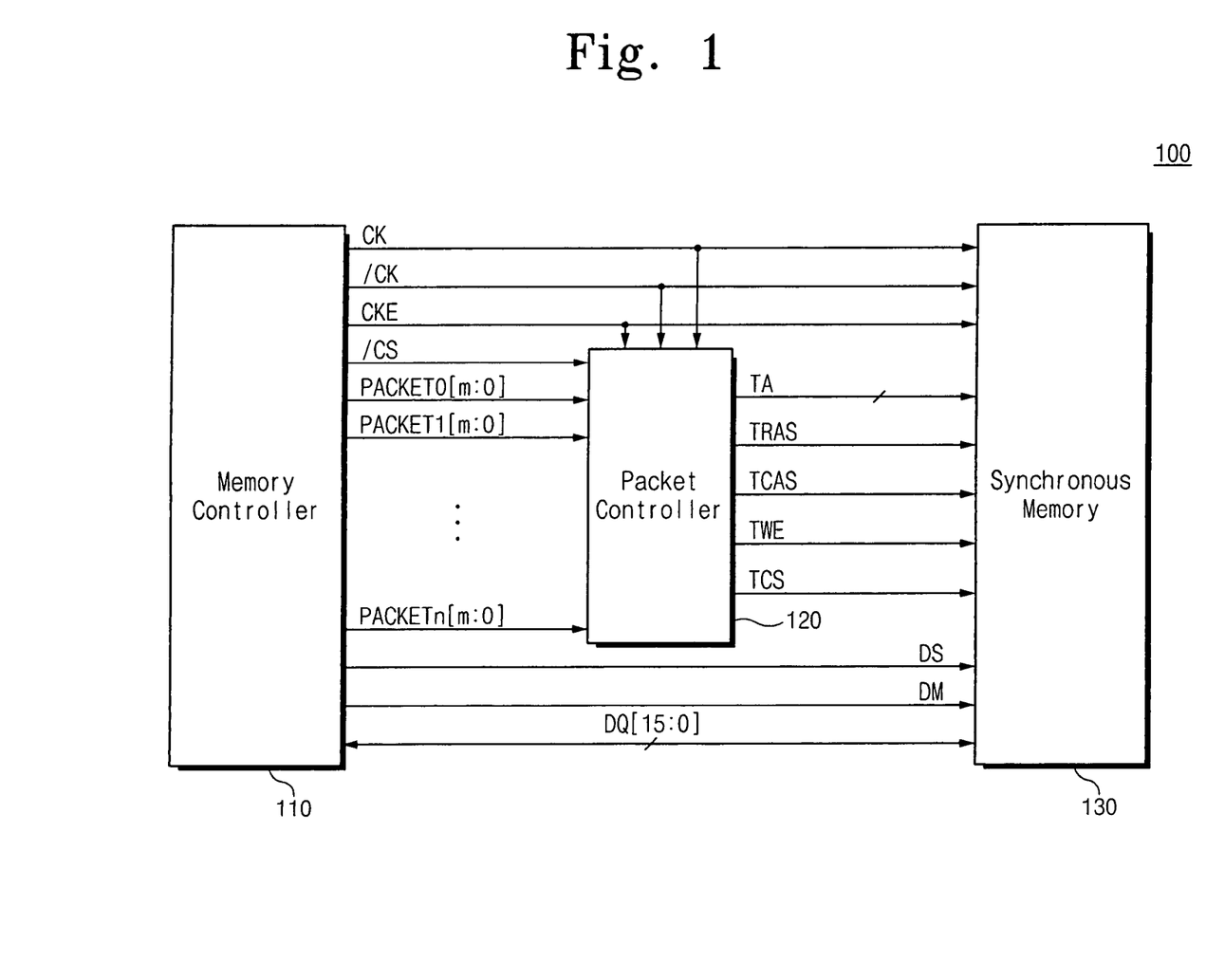
FIG. 1 is a block diagram of a memory system according to embodiments of the present invention.

Example FIG. 1 is a block diagram of a memory system according to embodiments of the present invention. Referring to FIG. 1, a memory system 100 includes a memory controller 110, a packet controller 120 used as an interface device, and a synchronous memory 130. The synchronous memory 130 may be a double data rate synchronous DRAM (DDR-SDRAM). It is apparent to those of ordinary skill in the art that the synchronous memory 130 is not limited to the DDR-SDRAM. In the memory system 100, the packet controller 120 and the synchronous memory 130 are mounted on one package to construct MCP or SIP. Further, it is apparent to those of ordinary skill in the art that the packet controller 120 and the synchronous memory 130 can be constructed in system on chip (SOC). The packet controller 120 and the synchronous memory 130 operate in synchronization with clock signals CK and /CK, which are output from the memory controller 110. Specifically, the synchronous memory 130 may perform a burst operation in synchronization with the clock signals CK and /CK. The memory controller 110 may generate address and command signals, which may be provided to the synchronous memory 130, in packet form. The packet controller 120 receives packet data from the memory controller 110 and converts the packet data into address and control (or command) signals to match the communication protocol of the synchronous memory 130.

The memory controller 110 converts address and command signals in packet form. For example, while the address and command signals are applied in parallel to the synchronous memory 130, the memory controller 110 converts the address and command signals in series. Here, such a converted data is referred to as packet data or data packet. Packet data PACKET0[m:0] to PACKETn[m:0] are transferred to the packet controller 120 for predetermined cycles of the clock signal CK (in this embodiment, 2 cycles). For example, each packet includes 4 bits of data and is transferred from the memory controller 110 to the packet controller 120 one bit by one bit at every half the period of the clock signal CK. The packet controller 120 operates in synchronization with the clock signals CK and /CK, which are output from the memory controller 110 and converts the input packet data to match the communication protocol of the synchronous memory 130 in response to control signals /CS and CKE, which are output from the memory controller 110. The packet controller 120 begins to receive the packet data from the memory controller 110 when the control signal /CS is activated. In other words, the activation of the chip select signal /CS is used as a packet enable signal that informs transmission of the packet data. In embodiments, command information is assigned to respective first positions of the packet data PACKET0 to PACKETn and address information is assigned to the other positions thereof.

When the control signal ICS (as the packet enable signal) is activated, the packet controller 120 analyzes the command information that is located at the respective first positions of the packet data PACKET0 to PACKETn. In other words, the packet controller 120 detects whether the command information represents an operation requiring address information (e.g. a read operation or a write operation) or an operation requiring no address information (e.g. an auto refresh operation, a power down operation, or a bank precharge operation). The packet controller 120 controls the timing of control signals TCS, TRAS, TCAS and TWE to make the operation time period of the synchronous memory 130 different according the result of the judgment. For example, if the command information represents an operation requiring address information (e.g. a read operation or a write operation), the packet controller 120 receives all addresses necessary for the operation and then generates the control signals an internal row strobe signal (TRAS), an internal column strobe signal (TCAS), an internal write enable signal (TWE), and an internal chip select signal (TCS). Likewise, if the command information represents an operation requiring no address information (e.g. an auto refresh operation, a power down operation, or a bank precharge operation), the packet controller 120 does not receive the addresses but generates the control signals TCS, TRAS, TCAS and TWE the moment the command information is input. This means that the entire operation speed can be improved.

Referring to FIG. 1, while the address and command signals are transferred in packet form, data is transferred without modification between the memory controller 110 and the synchronous memory 130. The synchronous memory 130 operates in synchronization with the clock signals CK and /CK and performs read and write operations in response to the address and control (or command) signals, which are output from the packet controller 120. The packet controller 120 and the synchronous memory 130 may be mounted on the same package. The synchronous memory 130, (e.g. DDR-SDRAM) receives the addresses, the commands, and data in a general manner. In other words, the synchronous memory 130 has the same pin structure as a modular DDR-SDRAM. If the packet controller 120 is not used, the SIP or MCP with the synchronous memory 130 would require all pins necessary for the synchronous memory 130, which may increase size and costs. In a case that the address and command signals necessary for the synchronous memory 130 are transferred in packet form from the memory controller 110 to the packet controller 120, the number of pins that are required by the SIP or MCP with the synchronous memory 130 is smaller than that necessary for the synchronous memory 130.

Since the packet controller 120 and the synchronous memory 130 are formed on one substrate, have a relatively small number of pins, and relatively low power consumption, embodiments of the present invention are referred to as $L^2RAM$ (low pin and low power RAM). The $L^2RAM$ may be adaptable for the mobile applications.

Figure 2:
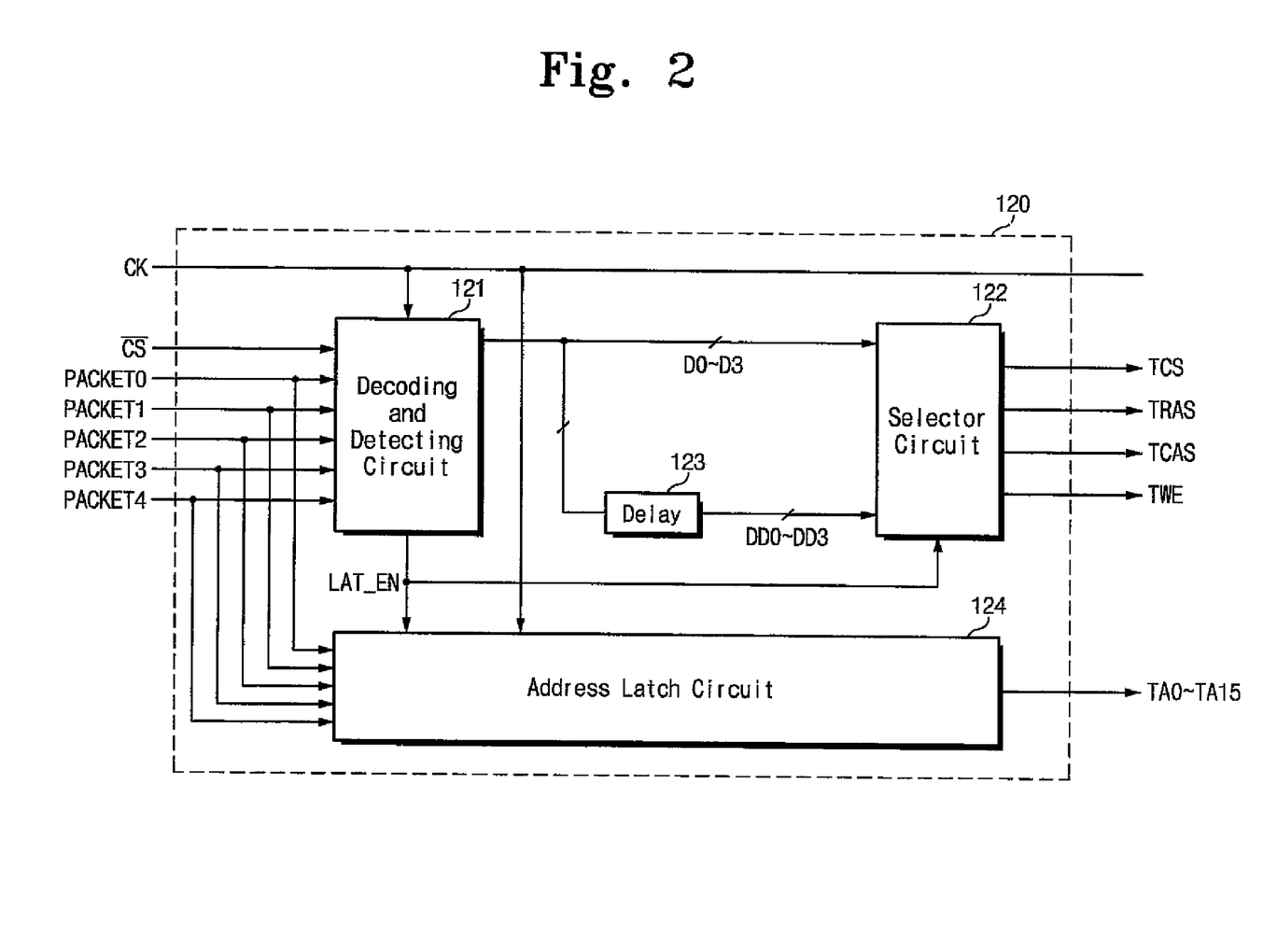
FIG. 2 is a block diagram of a packet controller according to embodiments of the present invention.

Example FIG. 2 is a block diagram of the packet controller 120 of FIG. 1 according to embodiments of the present invention. In embodiments, there are five data packets and each data packet is 4 bits. However, it is apparent to those of ordinary skill in the art that the number of data packets and the number of packet data bits can be varied depending on memory systems (or information process systems).

Referring to FIG. 2, the packet controller 120 of embodiments of the present invention includes a decoding and detecting circuit 121, a selector circuit 122, a delay circuit 123, and an address latch circuit 124. 4-bit data packets may be transferred through five packet pins PACKET0 to PACKET4 for two cycles of the clock signal CK. Command information may be assigned to respective first positions of the data packet. In addition to the command information, address information may be contained in the first positions of the packet data, depending on the number of packet pins. The command information may be a combination of control signals TCS, TRAS, TCAS and TWE or a combination of data bits that define operation modes.

The decoding and detecting circuit 121 receives packet data bits that are input through the packet pins PACKET0 to PACKET4, at a first edge (for example, low-to-high transition) of the clock signal CK after the chip select signal /CS is activated. The decoding and detecting circuit 121 decodes the input packet data bits to output the decoding signals D0 to D3. At the same time, the decoding and detecting circuit 121 detects whether the input packet data bits represent an operation requiring the address information. If the input packet data bits represent an operation requiring the address information, the decoding and detecting circuit 121 activates a latch enable signal LAT_EN. If the input packet data bits represent an operation requiring no address information, the decoding and detecting circuit 121 inactivates the latch enable signal LAT_EN.

The delay circuit 123 delays the output signals D0 to D3 of the decoding and detecting circuit 121 by a predetermined time (e.g. 1.5 cycle of the clock signal). The selector circuit 122 selects the output signals D0 to D3 of the decoding and detecting circuit 121 or the output signals DD0 to DD3 of the delay circuit 123 in response to the latch enable signal LAT_EN and outputs the selected signals as the control signals TCS, TRAS, TCAS and TWE. The address latch circuit 124 operates in response to the latch enable signal LAT_EN. When the latch enable signal LAT_EN is activated, the address latch circuit 124 latches the packet data bits that are transferred in series through the packet data pins PACKET0 to PACKET4. The address latch circuit 124 outputs the latched data bits as the address signals TA0 to TA15. If the latch enable signal LAT_EN is inactivated, the address latch circuit 124 does not operate.

Figure 3:
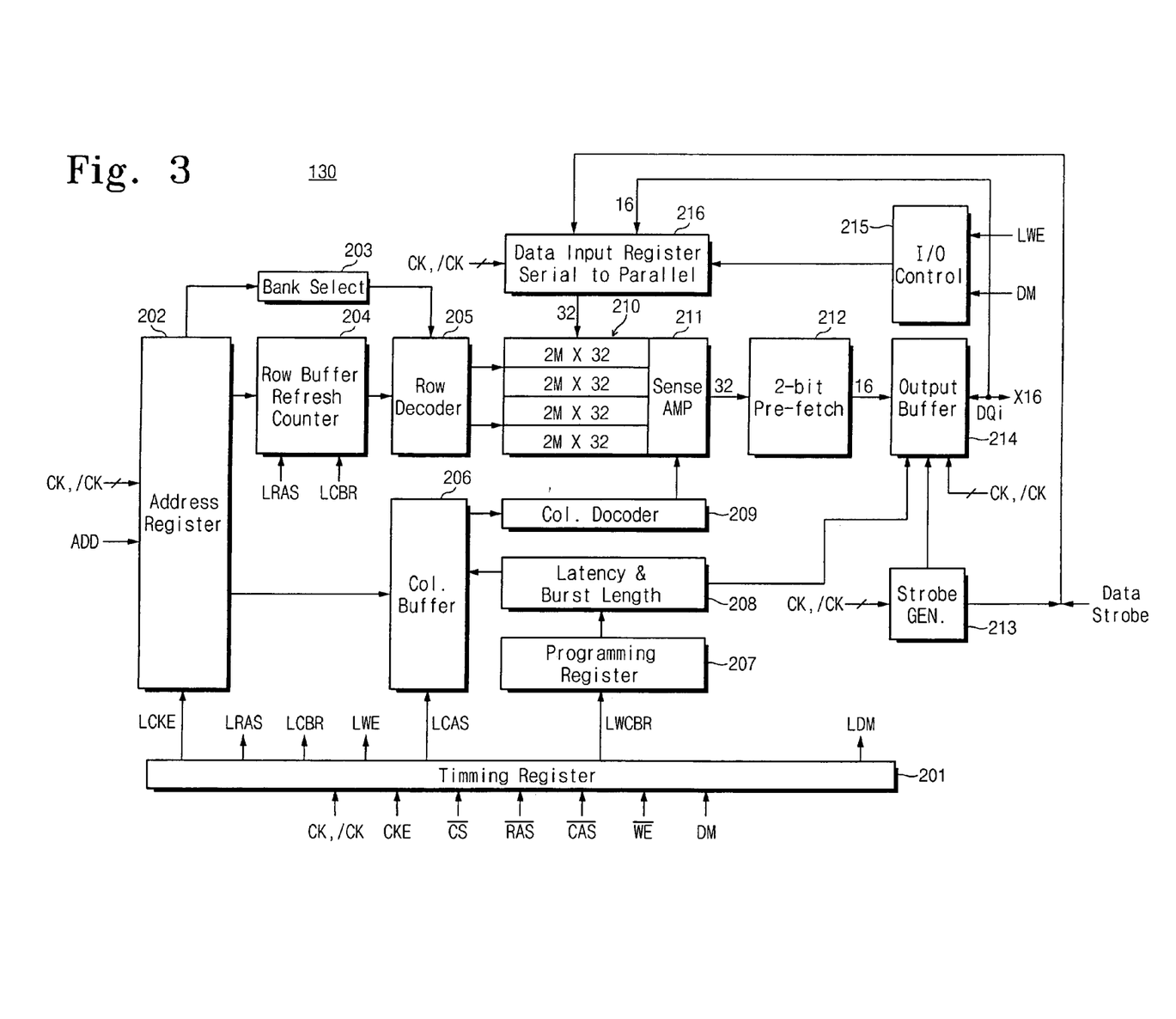
FIG. 3 is a block diagram of a synchronous memory according to embodiments of the present invention.

Example FIG. 3 is a block diagram of the synchronous memory 130 of FIG. 1, according to embodiments of the present invention. Although the synchronous memory 130 of embodiments of the present invention is configured using DDR-SDRAM, it is apparent to those of ordinary skill in the art that the synchronous memory 130 is not limited to DDR-SDRAM. The synchronous memory 130 operates in synchronization with the clock signals CK and /CK, which are supplied from the memory controller 110. In other words, the read and write operations of the synchronous memory 130 are performed in synchronization with the clock signals CK and /CK. As shown, the clock signals CK and /CK from the memory controller 110 are used in a timing register 201, an address register 202, a data strobe generator 213, a data output buffer 214, and a data input register 216.

Although the address and command signals are supplied from the memory controller 110 to the packet controller 120 in packet form, the synchronous memory 130 normally operates according to the address and command signals, which are supplied by the packet controller 120 in the same manner as a modular SDRAM communication protocol. In other words, the synchronous memory 130 operates in a similar manner as a modular DDR-SDRAM. The synchronous memory 130 of embodiments of the present invention performs a burst operation (or an operation of internally increasing column addresses) in synchronization with the clock signals CK and /CK. An internal operating frequency (that is a reference of burst operation of the synchronous memory 130) is identical to that of the clock signal CK, which is supplied from the memory controller 110.

Figure 4:
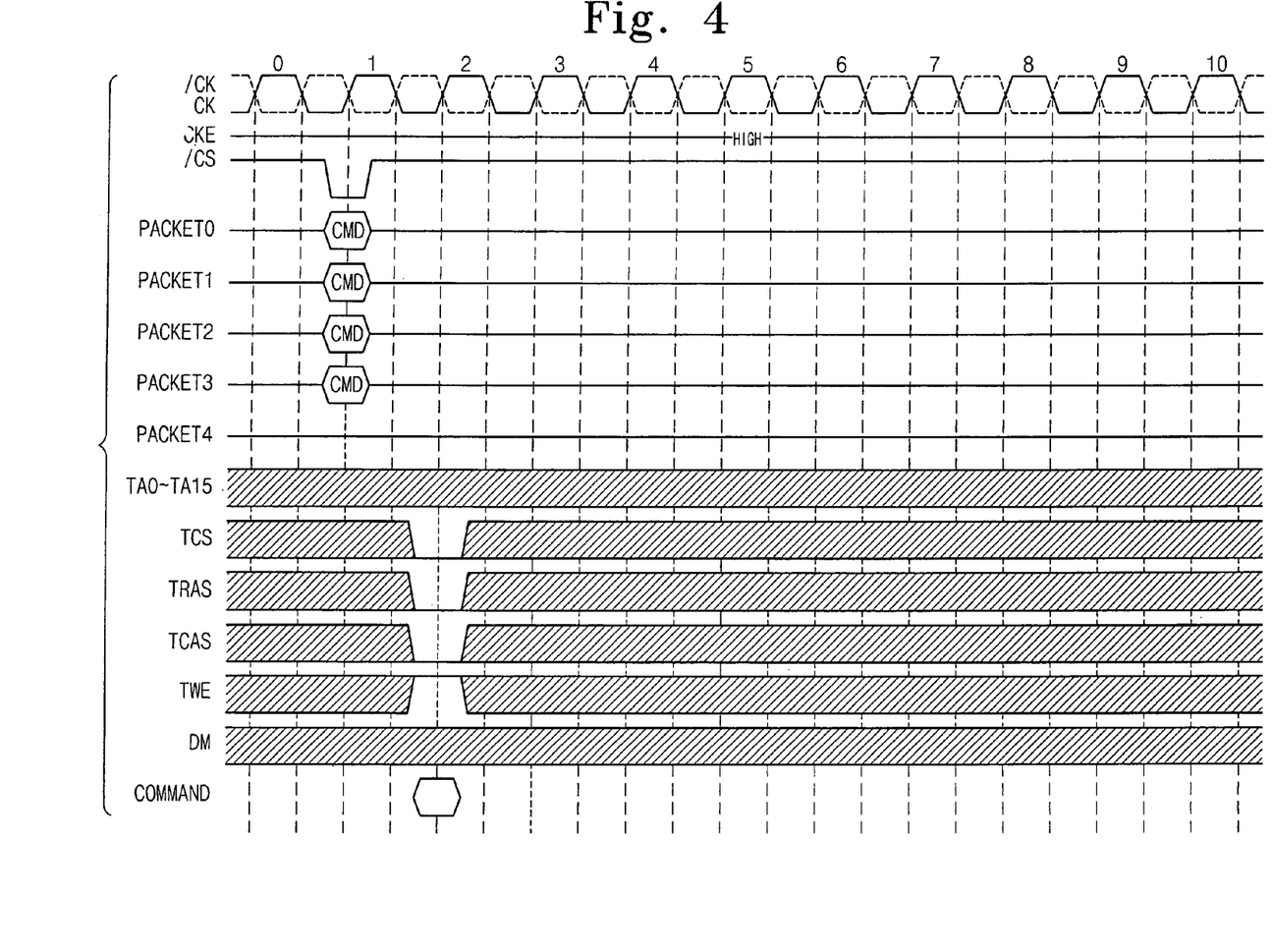
FIGS. 4 and 5 are timing diagrams illustrating operations of a packet controller and a synchronous memory according to embodiments of the present invention.

Example FIG. 4 is a timing diagram illustrating the operations of the packet controller 120 and the synchronous memory 130 when a requested operation does not require address information. Example operations that do not require address information include an auto refresh operation, a self refresh operation, a power down operation, and a bank precharge operation. For example purposes, only the auto refresh operation of the memory system will be described.

For the auto refresh operation of the synchronous memory 130, the memory controller 110 activates the control signal /CS at a low level and outputs 4-bit serial packet data PACKET0[3:0], PACKET1[3:0], PACKET2[3:0], PACKET3[3:0] and PACKET4[3:0] to the packet controller 120 in synchronization with the clock signal CK. When the control signal /CS is activated, the packet controller 120 sequentially receives the respective data bits of the packet data PACKET0[3:0], PACKET1[3:0], PACKET2[3:0], PACKET3[3:0] and PACKET4[3:0] in synchronization with the clock signal CK. The decoding and detecting circuit 121 of the packet controller 120 decodes the first data bits of the packet data PACKET0[3:0], PACKET1[3:0], PACKET2[3:0], PACKET3[3:0] and PACKET4[3:0] and generates the decoding signals D0 to D3.

At the same time, the decoding and detecting circuit 121 detects whether or not the first data bits of the packet data PACKET0[3:0], PACKET1[3:0], PACKET2[3:0], PACKET3[3:0] and PACKET4[3:0] represent an operation requiring address information. If the first data bits of the packet data PACKET0[3:0], PACKET1[3:0], PACKET2[3:0], PACKET3[3:0] and PACKET4[3:0] represent an operation requiring no address information, the decoding and detecting circuit 121 inactivate the latch enable signal LAT_EN. This causes the address latch circuit 124 to be inactivated so it does not receive input packet data. At the same time, the selector circuit 122 selects the output signals D0 to D3 of the decoding and detecting circuit 121 in response to the inactivated latch enable signal LAT_EN and outputs the selected signals as the control signals TCS, TRAS, TCAS and TWE. The synchronous memory 130 performs the auto refresh operation in response to the control signals TCS, TRAS, TCAS and TWE, which are output from the selector circuit 122.

Figure 5:
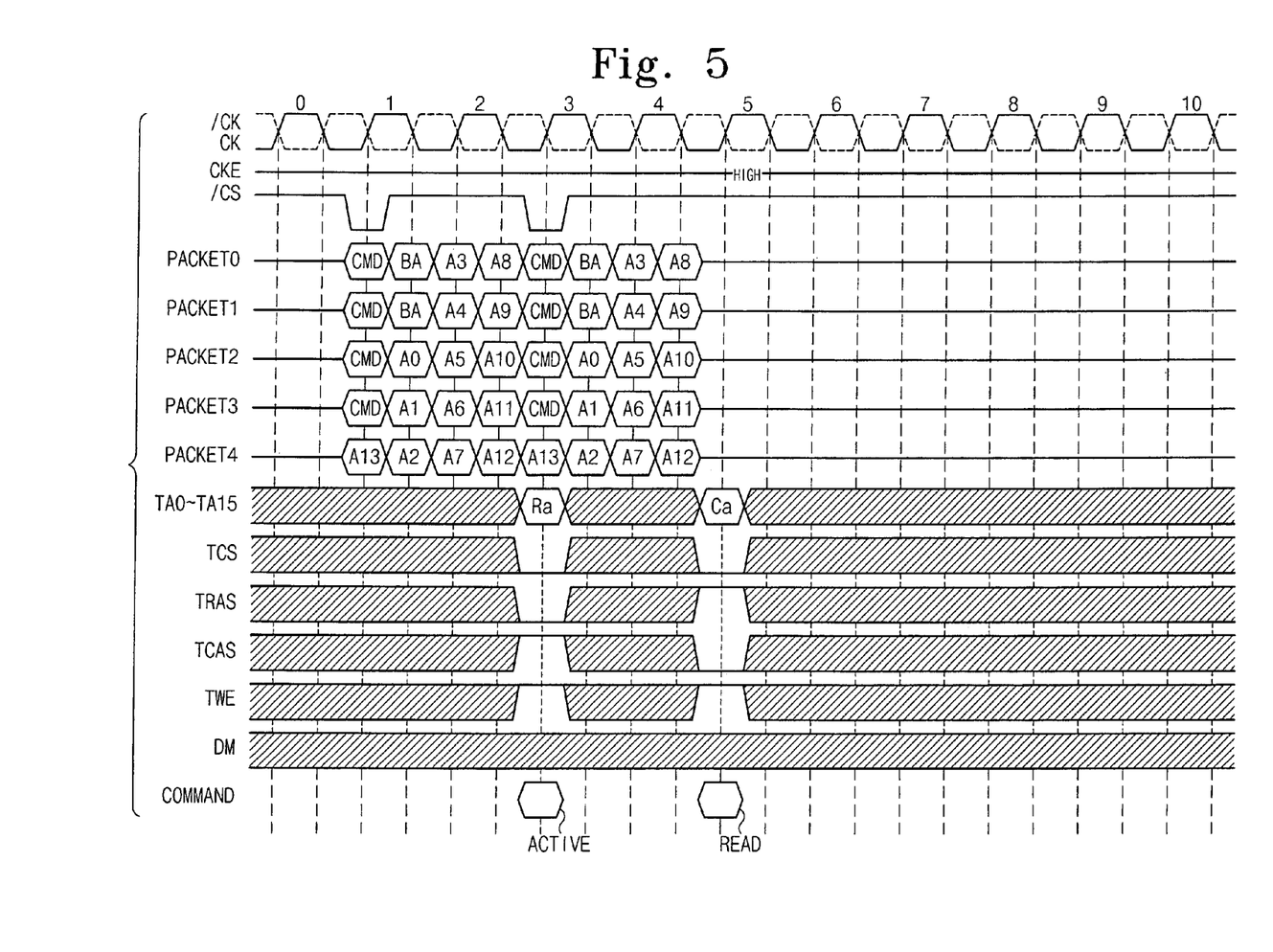

Example FIG. 5 is a timing diagram illustrating the operation of the memory system when the operation demanding the address information is performed. A row address and an active command are supplied to the synchronous memory 130 for the data read. After a predetermined time, a column address and a read command are supplied to the synchronous memory 130. In embodiments, an operation of the packet controller 120 will be described using the read operation. A write operation of the packet controller 120 is performed in a similar manner as the read operation thereof. Therefore, its description will be omitted.

For reading data from the synchronous memory 130, the memory controller 110 activates the control signal /CS to a low level and outputs 4-bit serial packet data PACKET0[3:0], PACKET1[3:0], PACKET2[3:0], PACKET3[3:0] and PACKET4[3:0] (including the active command) to the packet controller 120 in synchronization with the clock signal CK. When the control signal /CS is activated, the packet controller 120 sequentially receives the respective data bits of the packet data PACKET0[3:0], PACKET1[3:0], PACKET2[3:0], PACKET3[3:0] and PACKET4[3:0] in synchronization with the clock signal CK. The decoding and detecting circuit 121 of the packet controller 120 decodes the first data bits of the packet data PACKET0[3:0], PACKET1[3:0], PACKET2[3:0], PACKET3[3:0] and PACKET4[3:0] and generates the decoding signals D0 to D3.

At the same time, the decoding and detecting circuit 121 detects whether or not the first data bits of the packet data PACKET0[3:0], PACKET1[3:0], PACKET2[3:0], PACKET3[3:0] and PACKET4[3:0] represent an operation requiring address information. If the first data bits of the packet data PACKET0[3:0], PACKET1[3:0], PACKET2[3:0], PACKET3[3:0] and PACKET4[3:0] represent an operation requiring the address information, the decoding and detecting circuit 121 activate the latch enable signal LAT_EN. As the latch enable signal LAT_EN is activated, the selector 122 selects the output signals DD0 to DD3 of the delay circuit 123, instead of the output signals D0 to D3 of the decoding and detecting circuit 121. The output signals D0 to D3 of the decoding and detecting circuit 121 will be delayed by 1.5 clock cycles through the delay circuit 123. The delayed signals DD0 to DD3 are output to the synchronous memory 130. As the latch enable signal LAT_EN is activated, the address latch circuit 124 sequentially latches the remaining packet data bits in synchronization with the clock signal CK and outputs the latched signals as the address signals TA0 to TA15. In other words, the packet controller 120 receives packet data bits that are input at a high edge and a low edge of the clock signal CK of first/second cycles. Then, the input packet data bits are transferred to the synchronous memory 130 as the active command and row address signals. The synchronous memory 130 receives the active command and row address signals at a third cycle.

The memory controller 110 activates the control signal /CS to a low level and outputs 4-bit serial packet data PACKET0[3:0], PACKET1[3:0], PACKET2[3:0], PACKET3[3:0] and PACKET4[3:0], including the read command, to the packet controller 120 in synchronization with the clock signal CK. When the control signal /CS is activated, the packet controller 120 sequentially receives the respective data bits of the packet data PACKET0[3:0], PACKET1[3:0], PACKET2[3:0], PACKET3[3:0] and PACKET4[3:0] in synchronization with the clock signal CK. The decoding and detecting circuit 121 of the packet controller 120 decodes the first data bits of the packet data PACKET0[3:0], PACKET1[3:0], PACKET2[3:0], PACKET3[3:0] and PACKET4[3:0] and generates the decoding signals D0 to D3.

At the same time, the decoding and detecting circuit 121 detects whether or not the first data bits of the packet data PACKET0[3:0], PACKET1[3:0], PACKET2[3:0], PACKET3[3:0] and PACKET4[3:0] represent an operation requiring the address information. If the first data bits of the packet data PACKET0[3:0], PACKET1[3:0], PACKET2[3:0], PACKET3[3:0] and PACKET4[3:0] represent an operation requiring the address information, the decoding and detecting circuit 121 activates the latch enable signal LAT_EN. As the latch enable signal LAT_EN is activated, the selector 122 selects the output signals DD0 to DD3 of the delay circuit 123, instead of the output signals D0 to D3 of the decoding and detecting circuit 121. The output signals D0 to D3 of the decoding and detecting circuit 121 will be delayed by 1.5 clock cycles through the delay circuit 123. The delayed signals DD0 to DD3 are output to the synchronous memory 130. As the latch enable signal LAT_EN is activated, the address latch circuit 124 sequentially latches the remaining packet data bits in synchronization with the clock signal CK and outputs the latched signals as the address signals TA0 to TA15. In other words, the packet controller 120 receives packet data bits that are input at a high edge and a low edge of the clock signal CK of third/fourth cycles. Then, the input packet data bits are transferred to the synchronous memory 130 as the read command and column address signals at the same time. The synchronous memory 130 receives the read command and column address signals at a fifth cycle. Then, the data read operation will be performed.

Figure 6:
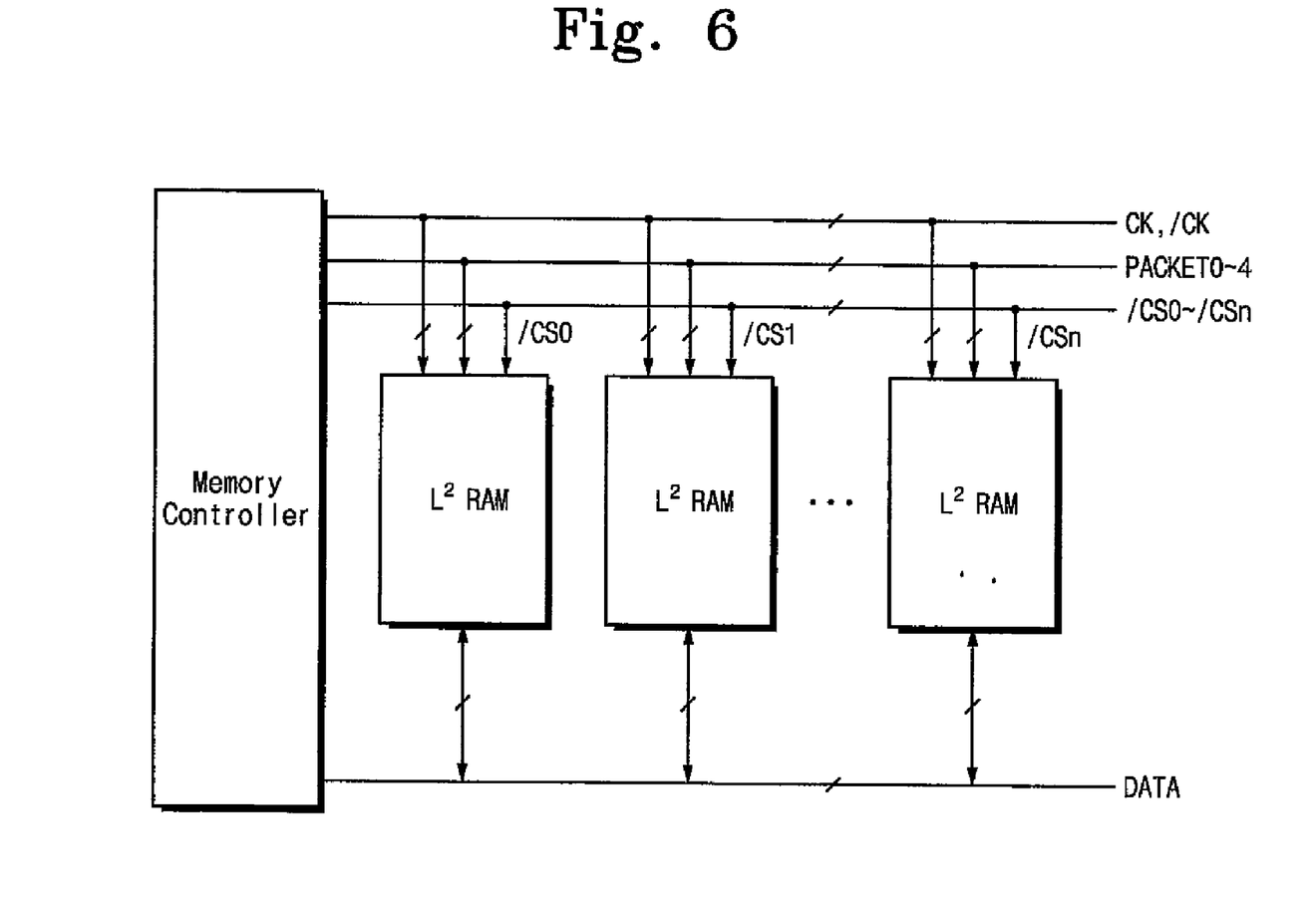
FIG. 6 is a block diagram of a memory system according to embodiments of the present invention.

As described above, L²RAM configured with the packet controller and the synchronous memory is controlled by the memory controller, the chip select signal from the memory controller is used as the packet enable signal that informs a transmission start of the packet data. However, in case the L²RAM is used in the module form, the chip select signals corresponding to L²RAMs are used as the packet enable signals informing a transmission start of the packet data and as the select signals for selecting corresponding L²RAMs. For example, as shown in example FIG. 6, when a plurality of L²RAMs are controlled by the memory controller, the chip select signals /CS0 to /CSn are assigned to the respective L²RAMs. Accordingly, the chip select signals corresponding to the respective L²RAMs are used as the packet enable signals informing a transmission start of the packet data and as the select signals for selecting corresponding L²RAMs.

As described above, the address and command signals to be input to the synchronous memory within the package are transferred in packet form. The packet data transferred in response to the activated chip select signal are converted, thereby reducing the number of pins of MCP or SIP. The operation time periods of the synchronous memory can be controlled differently according to whether the operation demands the address information by assigning the command information to the first position of the packet data, thereby improving the performance of the memory.

It will be apparent to those skilled in the art that various modifications and variations can be made in embodiments of the present invention. Thus, it is intended that the present invention covers the modifications and variations of this invention provided they come within the scope of the appended claims and their equivalents.

What is claimed is:

1. A memory system comprising:
   a synchronous memory; and
   a packet controller receiving a plurality of data packets via
      a plurality of packet pins, respectively, when a packet enable signal is activated, and comprising:
      a decoding and detecting circuit outputting decoding signals and generating a latch enable signal having a first or a second logic level;
      a delay circuit receiving the decoding signals and outputting delayed decoding signals;
      a selector circuit receiving the decoding signals and the delayed decoding signals and providing either the decoding signals or the delayed decoding signals to the synchronous memory as control signals in response to the latch enable signal; and
      an address latch circuit latching bits of the data packets in response to the latch enable signal when the latch enable signal has the first logic level, and providing at least some of the latched bits to the synchronous memory as address signals when the latch enable signal has the first logic level,
   wherein the decoding and detecting circuit receives first bits of the data packets through the packet pins respectively, generates the latch enable signal having the first logic level when the first bits indicate an operation requiring address information, and generates the latch enable signal having the second logic level when the first bits indicate an operation not requiring address information.

2. The memory of claim 1, wherein, when the first bits indicate an operation not requiring address information, the selector circuit provides the decoding signals to the synchronous memory as the control signals, and the synchronous memory operates in response to the control signals output from the selector circuit without receiving the address signals.

3. The memory of claim 1, wherein, when the first bits indicate an operation requiring address information, the selector circuit provides the delayed decoding signals to the synchronous memory as the control signals, and the synchronous memory operates in response to the control signals and the address signals.

4. The memory of claim 1, wherein the first bits are a combination of data bits for defining the command.

5. The memory of claim 1, wherein the first bits are a combination of the control signals.

6. The memory of claim 1, wherein the packet enable signal is a chip select signal.

7. The memory of claim 1, wherein the synchronous memory performs a burst operation in synchronization with a clock signal.

8. The memory of claim 1, wherein the synchronous memory and the packet controller are mounted on one package.

9. The memory of claim 8, wherein the package is one of a multi-chip package (MCP) and a system in package (SIP).

10. The memory of claim 1, wherein a burst operation of the synchronous memory is performed at the same operating frequency as a clock signal.

11. The memory of claim 1, wherein the control signals include an internal row strobe signal (TRAS), an internal column strobe signal (TCAS), an internal write enable signal (TWE), and an internal chip select signal (TCS).

12. The memory of claim 1, wherein the synchronous memory includes:
   a memory cell array having a plurality of memory cells arranged in rows and columns;
   a row select circuit which selects the rows of the memory cell array in response to a row address output from the packet controller;
   a column select circuit which selects the columns of the memory cell array in response to a column address output from the packet controller; and
   a read/write circuit which reads/writes data from/to the memory cells designated by the selected rows and columns,
   wherein the row and column select circuits and the read/write circuit operate in synchronization with the clock signal.

13. A memory system comprising:
   a synchronous memory;
   a packet controller providing control signals to the synchronous memory in synchronization with a clock signal, and selectively providing address information to the synchronous memory; and
   a memory controller providing a plurality of data packets to the packet controller, and generating the clock signal and a packet enable signal,
   wherein each of the data packets comprises a plurality of bits, including a first bit,
   wherein the packet controller selectively activates a latch enable signal in accordance with whether the first bits of the data packets indicate an operation requiring address information,
   wherein the synchronous memory and the packet controller are mounted on one package, and
   wherein the packet controller comprises:
      a decoding and detecting circuit receiving the first bits through the packet pins, outputting decoding signals, and generating the latch enable signal having a first or a second logic level;
      a delay circuit receiving the decoding signals and outputting delayed decoding signals;
      a selector circuit receiving the decoding signals and the delayed decoding signals and providing either the decoding signals or the delayed decoding signals to the synchronous memory in response to the latch enable signal; and
      an address latch circuit latching bits of the data packets in response to the latch enable signal when the latch enable signal has the first logic level, and providing at least some of the latched bits to the synchronous memory as the address signals when the latch enable signal has the first logic level, wherein the decoding and detecting circuit generates the latch enable signal having the first logic level when the first bits indicate an operation requiring address information, and generates the latch enable signal having the second logic level when the first bits indicate an operation not requiring address information.

14. The memory system of claim 13, wherein the synchronous memory performs a burst operation in synchronization with the clock signal.

15. The memory system of claim 13, wherein the package is one of a multi-chip package (MCP) and a system in package (SIP).

16. The memory system of claim 13, wherein a burst operation of the synchronous memory is performed at the same operating frequency as the clock signal.

17. The memory system of claim 13, wherein, when the first bits indicate an operation not requiring address information, the selector circuit selects the output signals of the decoding circuit as the control signals, and the synchronous memory operates in response to the control signals output from the selector circuit without receiving the address signals.

18. The memory of claim 13, wherein, when the first bits indicate an operation requiring address information, the selector circuit selects output signals of the delay circuit as the control signals, and the synchronous memory operates in response to the control signals and the address signals.

19. A memory comprising:
a synchronous memory; and
a packet controller receiving a plurality of data packets via a plurality of packet pins, respectively, in synchronization with a clock signal when a packet enable signal is activated, providing control signals to the synchronous memory in synchronization with the clock signal, and selectively providing address information to the synchronous memory,
wherein first bits of the data packets indicate one of an operation requiring address information or an operation not requiring address information,
wherein, when the first bits indicate an operation requiring address information, the packet controller latches bits of the data packets, and provides the control signals and the address information to the synchronous memory following after a delay circuit, wherein the packet controller provides at least some of the latched bits to the synchronous memory as the address information, and
wherein, when the at least some of the first bits indicate an operation not requiring address information, the packet controller provides the control signals to the synchronous memory following without the delay.

20. The memory of claim 19, wherein, when the first bits indicate an operation not requiring address information, the packet controller provides the control signals to the synchronous memory after receiving the first bits without regard for the reception of remaining bits of the data packets.

21. The memory of claim 19, wherein, when the first bits indicate an operation requiring address information, the packet controller provides the address information and the control signals to the synchronous memory in synchronization with the clock signal after receiving all bits of the data packets.

22. The memory of claim 19, wherein the first bits are a combination of data bits which define a command.

23. The memory of claim 19, wherein the the first bits are a combination of data bits which define the control signals.

24. The memory of claim 19, wherein the packet enable signal is a chip select signal.

25. The memory of claim 19, wherein the synchronous memory performs a burst operation in synchronization with the clock signal.

26. The memory of claim 19, wherein the synchronous memory and the packet controller are mounted on one package.

27. The memory of claim 26, wherein the package is one of a multi-chip package (MCP) and a system in package (SIP).

28. The memory of claim 19, wherein a burst operation of the synchronous memory is performed at the same operating frequency as the clock signal.

29. The memory of claim 19, wherein the control signals include an internal mw strobe signal (TRAS), an internal column strobe signal (TCAS), an internal write enable signal (TWE), and an internal chip select signal (TCS).

30. The memory of claim 19, wherein the synchronous memory includes:
a memory cell array having a plurality of memory cells arranged in rows and columns;
a row select circuit which selects the rows of the memory cell array in response to a row address output from the packet controller;
a column select circuit which selects the columns of the memory cell array in response to a column address output from the packet controller; and
a read/write circuit which reads/writes data from/to the memory cells designated by the selected rows and columns,
wherein the row and column select circuits and the read/write circuits operate in synchronization with the clock signal.

* * * * *